United States Patent Office 3,579,558
Patented May 18, 1971

3,579,558
PROCESS FOR THE PRODUCTION OF
ω-AMINOALKANE NITRILES
Otto Immel, Krefeld-Uerdingen, Hans-Helmut Schwarz, Krefeld-Bockum, and Hermann Schnell, Krefeld-Uerdingen, Germany, assignors to Farbenfabriken Bayer Aktiengesellschaft, Leverkusen, Germany
No Drawing. Filed Sept. 25, 1968, Ser. No. 762,630
Claims priority, application Germany, Oct. 14, 1967,
F 53,775, F 53,776
Int. Cl. C07c 121/02
U.S. Cl. 260—465.2
5 Claims

ABSTRACT OF THE DISCLOSURE

Process of producing ω-aminoalkane nitriles by heating corresponding lactams with a stoichiometric excess of ammonia in the gaseous phase in the presence of a catalytic amount of a solid catalyst, said catalyst consisting essentially of magnesium silicate, calcium silicate, zinc silicate, aluminum silicate, manganese silicate, iron silicate, fluorinated aluminum oxide, fluorinated magnesium silicate, fluorinated calcium silicate, fluorinated zinc silicate, fluorinated aluminum silicate, fluorinated manganese silicate or fluorinated iron silicate.

---

The invention relates to an improved process for the production of ω-aminoalkane nitriles by the reaction of appropriate lactams with excess ammonia at an elevated temperature in the gaseous phase over solid catalysts. Whereas hitherto, for example, copper on silicagel, kaolin, aluminum oxide or aluminum phosphate or phosphoric acid on a carrier have been used as catalyst for this reaction, the process of the invention is characterized by the use of a catalytic amount of a solid catalyst consisting essentially of magnesium silicate, calcium silicate, zinc silicate, aluminum silicate, manganese silicate, iron silicate, fluorinated aluminum oxide, fluorinated magnesium silicate, fluorinated calcium silicate, fluorinated zinc silicate, fluorinated aluminum silicate, fluorinated manganese silicate or fluorinated iron silicate.

Whereas the catalyst hitherto used gives only poor yields or have only a low activity or are very sensitive to oxygen, the catalysts to be used according to the invention do not have these disadvantages.

The fluorinated silicates can be obtained by treating the silicates with hydrofluoric acid or with its neutral or acidic salts, or with complex fluorine-containing acids or their salts, or with fluorine-containing gases. The silicates can also be precipitated from a fluorine-containing solution. After drying, the catalysts may be calcinated, if desired, at between about 100 and 600° C. The content of fluorine may vary within wide limits, it expediently amounts to between about 0.1 and about 10 percent by weight.

The said catalysts can be used by themselves, in mixture and/or combination with one another, with or without a carrier, as solid bed catalysts or as fluid bed catalysts.

When the activity of the catalysts has diminished, it can be restored by heating the catalysts with oxygen or air.

The reaction of the lactams with ammonia is expediently carried out under normal pressure and in the temperature range from about 280 to about 400° C., preferably between about 300 and about 360° C.

The contact time of the gaseous mixture with the catalysts should lie between about 0.1 and about 10 seconds.

The expedient amount of ammonia is more than 5 moles, preferably about 10 to about 20 moles per mole lactam.

Lactams suitable for the process are, for example, butyrolactam, valerolactam, oenanthlactam and laurinlactam, but in industry the conversion of ε-caprolactam into ε-aminocapronitrile is of predominant importance. It is also possible to use the so-called cleavage lactam obtained by depolymerisation of polycaprolactam.

The ω-aminoalkane nitriles are important as intermediates for the production, for example, of the corresponding diamines by hydrogenation or for the production of pest control agents.

EXAMPLE 1

100 g. of active aluminum oxide ($\gamma$-$Al_2O_3$) with a particle size of 0.5–1 mm. and a specific surface of about 108 sq. m./g. are impregnated with a solution of 50 g. $NH_4HF_2$ in 150 ml. of water and stored at room temperature under a water jet vacuum for 16 hours. The liquid is then decanted and the solid matter dried at 120° C. The fluorine content of the catalyst so obtained amounts to 5.3 percent by weight.

278 g. caprolactam and 40 litres, per hour, of ammonia are passed over 70 g. of this catalyst at 340° C. for 20 hours. The reaction product still contains part of the starting components as well as ε-aminocaproic acid nitrile and byproducts. The organic component consists of 49.6 percent by weight ε-aminocaproic acid nitrile, 49.8 percent by weight lactam and 0.6 percent by weight of byproducts.

If, however, the active aluminum oxide is used without previous fluorination, then the same experimental conditions yield a reaction product the organic component of which consists of 39.3 percent by weight lactam, 52.6 percent by weight ε-aminocaproic acid nitrile, but 9.1 percent by weight of byproducts.

EXAMPLES 2–7

The silicates of the elements calcium, magnesium, zinc, manganese, aluminum and iron are either pressed to form pills or slurried with water to form a paste and then dried in order to obtain a granular material. The effect of these silicates as catalysts in the reaction of ε-caprolactam with ammonia to form aminocaproic acid nitrile was tested under various conditions. The reaction product still contains part of the starting materials as well as ω-aminocaproic acid nitrile, water and byproducts. The results of these experiments are compiled in the following table.

The composition of the organic component of the reaction mixture is given in columns 8, 9 and 10 of the table. The duration of the experiment is 6 hours in Examples 2 and 4, and 2 hours in the other examples.

| Catalyst | Amount of catalyst, g. | Particle size, mm. | Ammonia, litres/h. | Caprolactam, g./h. | Temp., °C. | Lactam, percent by weight | Aminocaproic acid nitrile, percent by weight | Byproducts, percent by weight |
|---|---|---|---|---|---|---|---|---|
| Example: | | | | | | | | |
| 2 ---- Ca silicate | 70 | 1–5 | 40 | 13.4 | 340 | 60.7 | 39.2 | 0.1 |
| 3 ---- Mg silicate | 20 | 0.5–5 | 40 | 16.5 | 360 | 48.5 | 51 | 0.5 |
| 4 ---- Zn silicate | 60 | 1 | 40 | 12.5 | 320 | 66.4 | 33.3 | 0.3 |
| 5 ---- Mn silicate | 30 | 5 | 40 | 21.5 | 380 | 72.0 | 27.7 | 0.3 |
| 6 ---- Al silicate | 30 | 0.5–1 | 40 | 10.5 | 300 | 60 | 39 | 1 |
| 7 ---- $Fe^{II}$ silicate | 40 | 5 | 40 | 20 | 360 | 68.4 | 31 | 0.6 |

EXAMPLE 8

Magnesium silicate ("pure, precipitated") is granulated and calcinated at 600° C. for 2 hours. 40 g. with a particle size of 1–4 mm. are used as catalyst for the reaction of laurinlactam with ammonia by passing 199.3 g. laurinlactam and 40 Nl., per hours, of ammonia over the catalyst at 350° C. in the course of 17¾ hours. The condensed reaction product (205.5 g.) contains 46.6 percent by weight of unreacted laurinlactam, 44.7 percent by weight ω-aminododecanic acid nitrile, water and a few byproducts. Referred to the reacted laurinlactam, the yield of ω-aminododecanic acid nitrile amounts to 89% of theory. The ω-aminododecanic acid nitrile (B.P. 132° C./0.7 mm. Hg; $n_D^{25}=1.4552$) is identified by the IR and NMR spectra and confirmed by elementary analysis:

Calcd. for $C_{12}H_{24}N_2$ (percent): C, 73.3; H, 12.3; N, 14.4. Found (percent): C, 73.1; H, 12.4; N, 14.6.

The ω-aminododecanic acid nitrile has previously not been described and is particularly valuable because polyamides with especially valuable properties can be obtained therefrom by hydrogenation to form the diamine and reaction of the latter with dicarboxylic acids.

We claim:
1. A process for producing ω-aminoalkane nitriles, the alkane moiety of which contains from 3 to 11 carbon atoms which comprises heating 1 mole of the corresponding lactam with about 5 to about 20 moles of ammonia in the gaseous phase to a temperature from about 280° to about 400° C. in the presence of a catalytic amount of a solid catalyst consisting essentially of magnesium silicate, calcium silicate, zinc silicate, aluminum silicate, manganese silicate, iron silicate, fluorinated aluminum oxide, fluorinated magnesium silicate, fluorinated calcium silicate, fluorinated zinc silicate, fluorinated aluminum silicate, fluorinated manganese silicate or fluorinated iron silicate, the contact time of the gaseous mixture with the catalyst being from about 0.1 to about 10 seconds.

2. The process of claim 1 wherein the temperature is from about 300° to about 360° C.

3. The process of claim 1 wherein the catalyst is a solid bed catalyst.

4. The process of claim 1 wherein the catalyst is a fluid bed catalyst.

5. The process of claim 1 wherein the lactam is butyrolactam, valerolactam, caprolactam, oenanthlactam or laurinlactam.

References Cited
UNITED STATES PATENTS

| | | | |
|---|---|---|---|
| 2,830,072 | 4/1958 | Garristen et al. | 260—465.5 |
| 3,043,860 | 7/1962 | Phillips et al. | 260—465.2 |

JOSEPH P. BRUST, Primary Examiner

U.S.Cl.X.R.

260—465.5